(12) United States Patent
Lee et al.

(10) Patent No.: US 7,837,377 B2
(45) Date of Patent: Nov. 23, 2010

(54) BACKLIGHT UNIT AND LIQUID CRYSTAL DISPLAY MODULE INCLUDING THE SAME

(75) Inventors: Sang-Bum Lee, Seoul (KR); Seung-Cheol Back, Daegu (KR); Myeong-Kuk Jin, Gyeonggi-do (KR); Kang-Ju Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 11/812,177

(22) Filed: Jun. 15, 2007

(65) Prior Publication Data
US 2008/0139008 A1 Jun. 12, 2008

(30) Foreign Application Priority Data
Dec. 11, 2006 (KR) .................. 10-2006-0125567

(51) Int. Cl.
*F21V 7/04* (2006.01)
(52) U.S. Cl. .................. 362/633; 349/149; 362/561
(58) Field of Classification Search .......... 362/33, 362/97, 561, 614, 616, 623, 632, 633, 634; 349/56, 58, 62, 65, 68, 113, 149; 439/56; 315/224, 276
See application file for complete search history.

(56) References Cited

U.S. PATENT DOCUMENTS

| | | | |
|---|---|---|---|
| 6,654,088 B2 * | 11/2003 | Morishita et al. ........... 349/113 |
| 7,304,434 B2 * | 12/2007 | Park et al. .................. 313/634 |
| 7,332,869 B2 * | 2/2008 | Yoo et al. .................. 315/224 |
| 7,391,167 B2 * | 6/2008 | Jang et al. .................. 315/291 |
| 7,427,977 B2 * | 9/2008 | Park et al. .................. 345/102 |
| 7,503,682 B2 * | 3/2009 | Kim .......................... 362/614 |
| 7,527,406 B2 * | 5/2009 | Kwon et al. ................ 362/561 |
| 2002/0149713 A1 * | 10/2002 | Ishida et al. ................. 349/58 |
| 2004/0233663 A1 | 11/2004 | Emslie et al. |
| 2005/0127848 A1 | 6/2005 | Park et al. |
| 2005/0243260 A1 * | 11/2005 | Kim .......................... 349/149 |
| 2006/0273739 A1 | 12/2006 | Park |
| 2007/0165151 A1 * | 7/2007 | Lee et al. ..................... 349/56 |
| 2007/0189041 A1 * | 8/2007 | Chen et al. ................. 362/631 |
| 2008/0143920 A1 * | 6/2008 | Back et al. ................... 349/58 |

FOREIGN PATENT DOCUMENTS

JP    10-125124    5/1998
KR    2003083079 A  * 10/2003

* cited by examiner

*Primary Examiner*—Hargobind S Sawhney
(74) *Attorney, Agent, or Firm*—Morgan Lewis & Bockius LLP

(57) ABSTRACT

A backlight unit for a display device includes a frame; a circuit board extending from an end of and on a first surface of the frame; lamps over the frame; and an inverter on a second surface of the frame connected to an end of each of the lamps via a first hole through the frame.

20 Claims, 10 Drawing Sheets

BACKLIGHT UNIT AND LIQUID CRYSTAL DISPLAY MODULE INCLUDING THE SAME

The present invention claims the benefit of Korean Patent Application No. 10-2006-0125567 filed in Korea on Dec. 11, 2006, which is hereby incorporated by reference in its entirety.

BACKGROUND OF THE INVENTION

1. Field of the Invention

Embodiments of the present invention relate to a liquid crystal display module (LCDM), and more particularly, to a backlight unit and for an LCDM including the same.

2. Discussion of the Related Art

LCD devices include an LCD module. The LCD module includes an LCD panel that displays images and a backlight unit that supplies light to the LCD panel. The LCD panel includes two substrates facing each other and spaced apart from each other. A liquid crystal material is interposed therebetween. Liquid crystal molecules of the liquid crystal material have a dielectric constant and refractive index anisotropic characteristic due to their long thin shape. Two electric field generating electrodes are formed on the two substrates, respectively. An orientation alignment of the liquid crystal molecules may be controlled by supplying a voltage to the two electrodes to change the transmittance of the LCD panel according to polarization properties of the liquid crystal material.

Generally, an additional light source is required because the LCD panel is a non-emissive-type display device. Accordingly, a backlight unit is disposed under the LCD panel. The LCD device displays images using light produced by the backlight unit and supplied to the LCD panel. Backlight units may be classified into a side-type backlight unit and a direct-type backlight unit in accordance with a disposition of the light source. The side-type backlight unit has one lamp or a pair of lamps disposed at a side portion of a light guide plate. Alternatively, at least one lamp is disposed at each side portion of the light guide plate, respectively.

The direct-type backlight unit has a plurality of lamps disposed under the light guide plate. In a large sized LCD module, the direct-type backlight unit may provide the LCD module with a uniform light source although the side-type backlight unit is more easily manufactured than the direct-type.

Further, the direct-type backlight unit includes a plurality of fluorescent lamps disposed in a row. Thus, the direct-type backlight unit directly irradiates light toward the liquid crystal panel. Therefore, since the direct-type backlight unit has a high uniformity when light is irradiated, it is suitable to be applied to a large-size LCD. The light guide plate is unnecessary in the direct-type backlight unit because the direct-type backlight unit is directly irradiated on the entire surface of the liquid crystal panel. In particular, the direct-type backlight unit has advantages that light efficiency is high, the use is convenient, the display size is not substantially limited. Therefore, the direct-type backlight unit may be utilized in a large-size LCD such as a 20-inch model.

Generally, the liquid crystal panel and the backlight unit are combined with each other using a main frame, a top frame and a bottom frame to prevent light-loss and to protect them from outside impact.

FIG. 1 shows a schematic perspective view of an inverter unit connected to a backlight unit of an LCDM according to the related art. Referring to FIG. 1, a direct-type backlight unit includes a plurality of fluorescent lamps 24 disposed in a row, and a reflective sheet 22 disposed under the plurality of fluorescent lamps 24. A side support 33 for supporting the fluorescent lamps 24 is disposed at an end portion of the bottom frame 50. The end portion of each of the fluorescent lamps 24 is inserted into a lamp holder 32. In addition, the lamp holder 32 is inserted into an opening of the side support 33. Although not shown, a side support 33 is disposed at each of the both end portions of the fluorescent lamps 24.

A plurality of wires 37, which are connected to an external circuit, extend from end portions of the plurality of fluorescent lamps 24 to a backside of the bottom frame 50, respectively. With respect to one of the wires 37, a socket connector 38a is formed at an end portion of the wire 37 to connect the wire 37 and the inverter unit 70. The inverter unit 70 is disposed under the bottom frame 50 and provides a power supply to the fluorescent lamps 24. The inverter unit 70 includes a plurality of inverters (not shown), a plug connector 38b connecting the wire 37 and the inverter unit 70, and an inverter PCB 35 on which the inverters and the plug connector 38b are mounted. A cover shield (not shown) protect the inverter unit 70 from an external impact. Substantially, by combining the socket connector 38a and the plug connector 38b, a power source of the inverter unit 70 can be provided to the fluorescent lamp 24 through the wire 37.

The fluorescent lamp 24 emits light when an alternating current waveform of a high voltage is applied to an electrode of the fluorescent lamp 24 through the wire 37 connected to the electrode of the fluorescent lamp 24. In FIG. 1, a high-low type fluorescent lamp 24 including a ground portion at an end portion thereof is illustrated.

The high-low type fluorescent lamp 24 includes at least two fluorescent lamps 24 forming a pair of fluorescent lamps 24. The end portion of the fluorescent lamp 24 is inserted into a lamp holder 32, and the fluorescent lamp 24 is electrically connected to the inverter unit 70 through wire 37. The wire 37 extends to the backside of the bottom frame 50, and an end portion of the wire 37 is connected to the socket connector 38a. Here, the inverter 36, which changes a direct voltage into an alternating current of a high voltage, should be required as a substantial element because the alternating current of the high voltage is demanded for driving the fluorescent lamp 24.

Accordingly, the inverter 36 and the inverter PCB 35 are independent from each other, and the inverter 36 is mounted on the inverter PCB 35. Since the inverter 36 dissipates a lot of heat, the inverter PCB 35 on which the inverter 36 is mounted is disposed on the backside of the bottom frame 50. The plug connector 38b is disposed on the inverter PCB 35 for being connected to the socket connector 38a. That is, the fluorescent lamp 24 is connected to the inverter PCB 35 by connecting the socket connector 38a to the plug connector 38b.

However, the wires 37 are exposed along edges and the backside of the bottom frame 50 because the fluorescent lamps 24 and the inverter unit 70 are connected to each other using the wires 37 forming a bridge between the fluorescent lamps 24 and the inverter unit 70. Thus, even if the inverter unit 70 is bent toward the backside of the bottom frame 50, the wires 37 are still exposed along edges and the backside of the bottom frame 50. Further, defects due to an electric interference between the exposed wires 37 or current leakage may occur. Furthermore, a crack between the fluorescent lamp 24 and the wires 37 at the soldering portion may be occur. Accordingly, emission of the fluorescent lamps 24 cannot occur uniformly.

FIG. 2 is a photograph showing an exploded portion of "IIa" region of FIG. 1 according to the related art. In FIG. 2, a fluorescent lamp 24 is connected to a wire 37, and the socket connector 38a is connected to an end portion of the wire 37. Generally, the fluorescent lamp 24 and the wire 37 are manually soldered to each other, as shown in part "IIb" in FIG. 2. The process time and the process cost increase because of the manual soldering. Furthermore, the material cost of the wire 37 increases because the wire 37 is used for the respective fluorescent lamps.

Further, the socket connector 38a is connected to an end portion of the wire 37 for connecting the inverter unit 70 (of FIG. 2).

FIG. 3 is a view of a lamp holder portion of a backlight unit for the LCDM of FIG. 1 according to the related art. Referring to FIG. 3, the related art LCDM of FIG. 1 requires a lamp holder 32 to hold the fluorescent lamp 24 at the bottom frame 50 (of FIG. 1).

The fluorescent lamp 24 may be one of a cold cathode fluorescent lamp (CCFL) and an external electrode fluorescent lamp (EEFL). When the direct-type backlight unit including CCFL is driven by a parallel driving method using one inverter, there is problem that only part of the fluorescent lamps are charged due to the charge characteristic of the CCFL.

Specifically, while the CCFL before charging has an unlimited resistant value, the CCFL has a small resistant value due to conductor state plasma that is generated from an inside of a glass tube of the fluorescent lamp. Accordingly, the resistant value of the CCFL after charging is substantially smaller than that of the primary state, so the amount of the tube current is increased.

Therefore, when the plurality of CCFLs are driven by a parallel driving method, the current is flowed toward a part of the fluorescent lamps having small resistant value after a primary charge. Accordingly, there is a problem that the other parts of the fluorescent lamps are not driven. Consequently, the direct-type backlight unit including the CCFL should include the number of inverters corresponding to the number of fluorescent lamps.

SUMMARY OF THE INVENTION

Accordingly, embodiments of the present invention are directed to a backlight unit and an LCDM including the same that substantially obviate one or more of the problems due to limitations and disadvantages of the related art.

An object of the present invention is to provide a backlight unit that controls a current valance for a fluorescent lamp.

Another object of the present invention is to prevent a current leakage in a backlight unit of an LCDM.

Another object of the present invention is to reduce the number of wires in a backlight unit of LCDM.

Another object of the invention is to reduce the number of inverters in a backlight unit of an LCDM.

Another object of the present invention is to reduce a process time and a process cost for fabricating a backlight unit of an LCDM.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a display device includes a frame; a circuit board extending from an end of and on a first surface of the frame; lamps over the frame; and an inverter on a second surface of the frame connected to an end of each of the lamps via a first hole through the frame.

In another aspect, a liquid crystal display module includes a liquid crystal panel; and a backlight unit for projecting light on the liquid crystal panel, the backlight unit includes a first frame; a circuit board extending from an end of and on a first surface of the first frame; lamps over the first frame; and an inverter on a second surface of the first frame connected to an end of each of the lamps via a first hole through the first frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the present invention, which are illustrated in the accompanying drawings.

Figure 1:
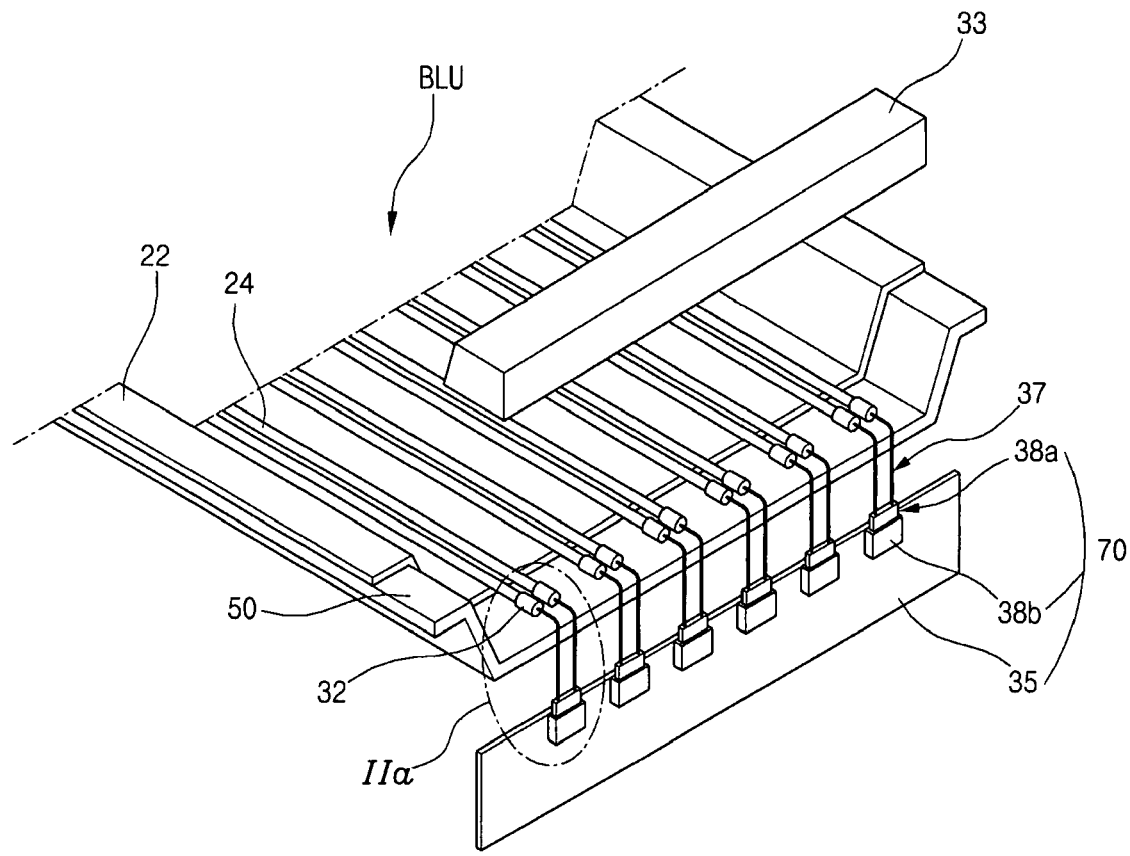
FIG. 1 shows a schematic perspective view of an inverter unit connected to a backlight unit of an LCDM according to the related art.
Figure 2:
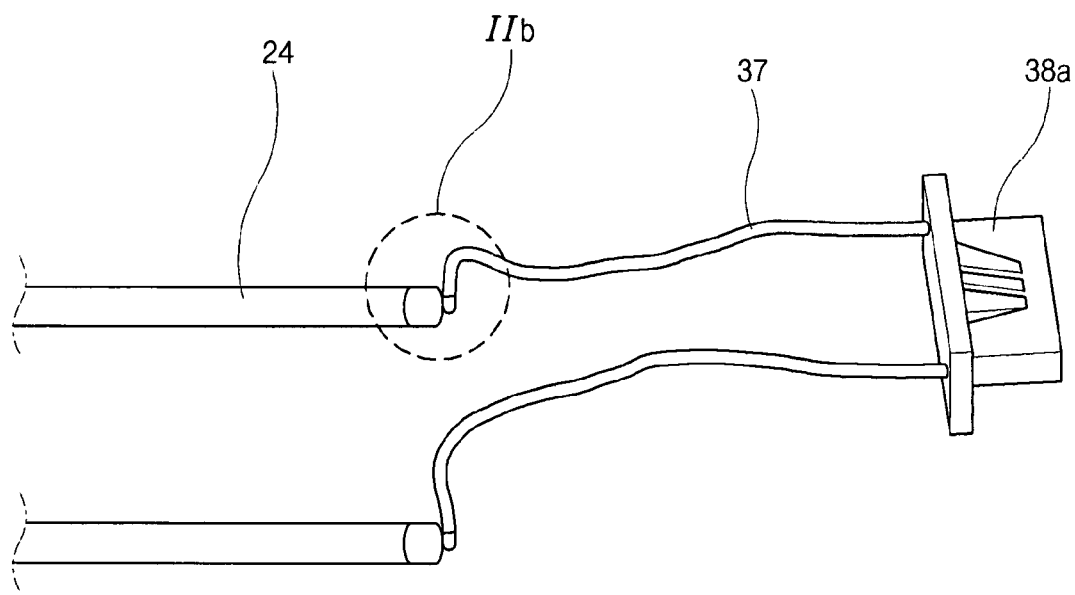
FIG. 2 is a photograph showing an exploded portion of "IIa" region of FIG. 1 according to the related art.
Figure 3:
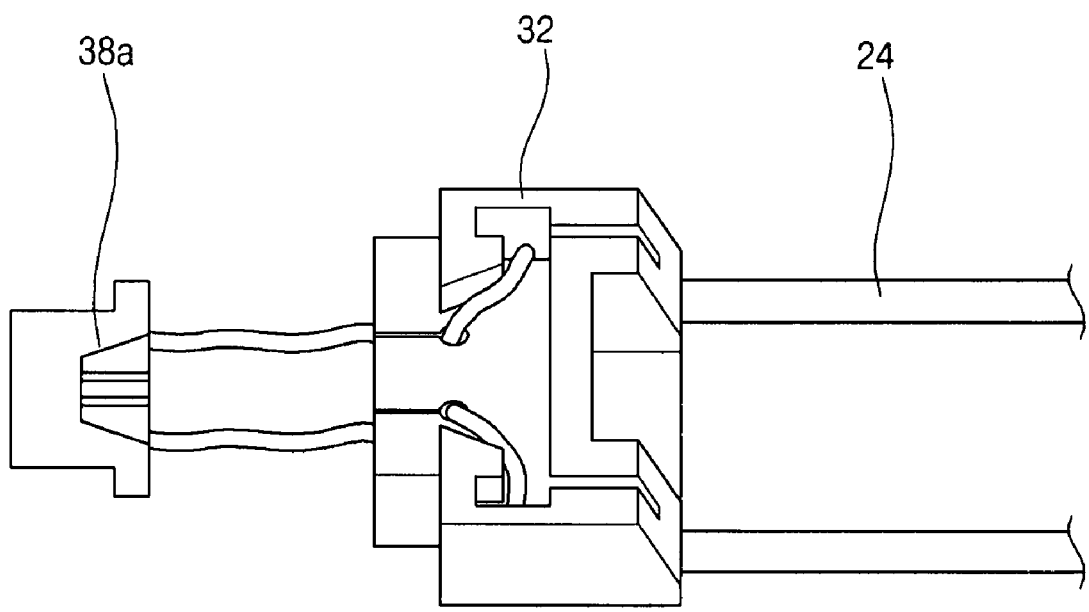
FIG. 3 is a view of a lamp holder portion of a backlight unit for the LCDM of FIG. 1 according to the related art.
Figure 4:
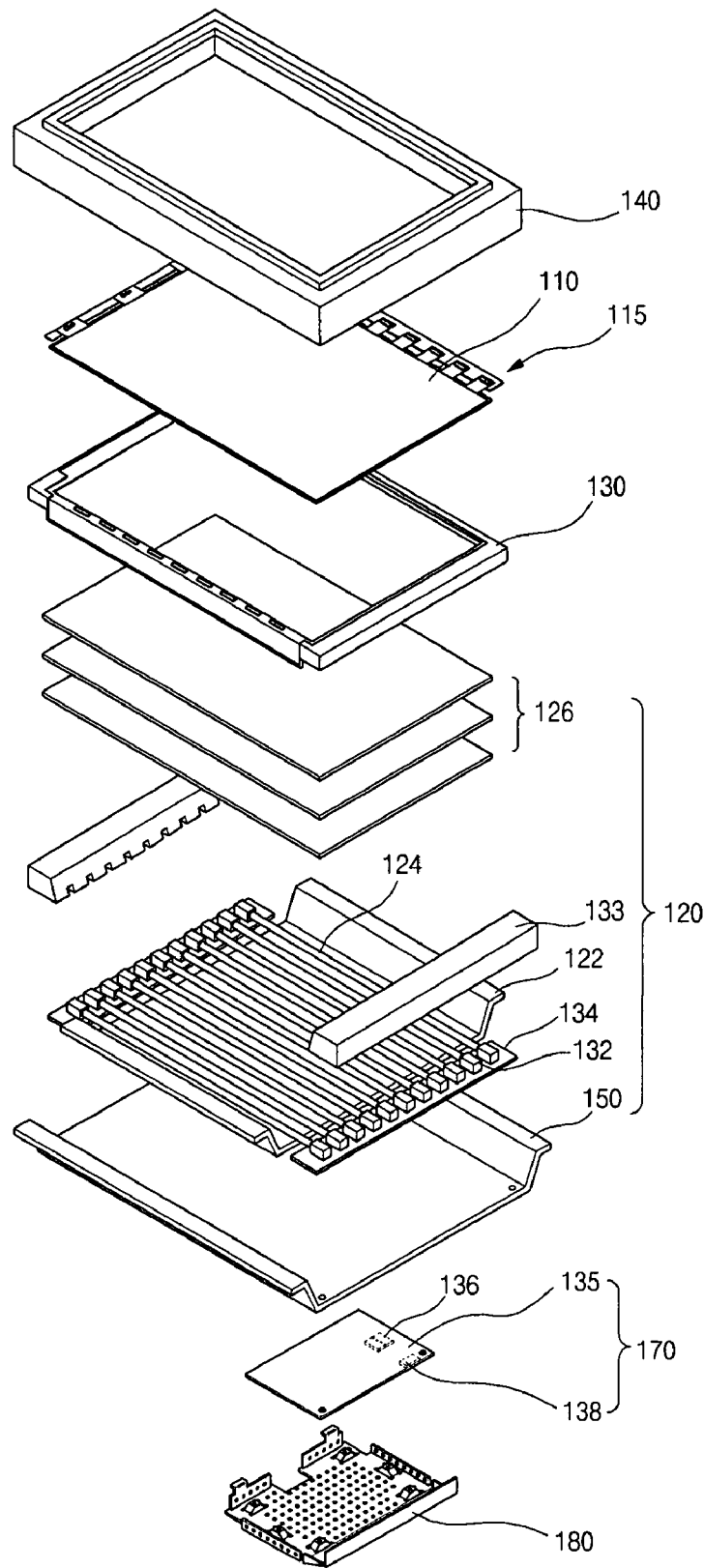
FIG. 4 shows an exploded perspective view of a liquid crystal display module (LCDM) with a backlight unit according to an embodiment of the present invention.

FIG. 4 shows an exploded perspective view of a liquid crystal display module (LCDM) with a backlight unit according to an embodiment of the present invention. Referring to FIG. 4, an LCDM includes a liquid crystal panel 110, a backlight unit 120, a main frame 130, a top frame 140, and a bottom frame 150, an inverter unit 170, and a cover shield 180. Although not shown, the liquid crystal panel 110 includes first and second substrates facing each other and a liquid crystal layer therebetween. The liquid crystal panel 110 is connected to gate and data printed circuit board (PCB)

(115a, 115b) that provide a scanning signal and an image signal to the liquid crystal panel 110, respectively.

The backlight unit 120 may be a direct type backlight unit at a backside of the liquid crystal panel 110. So, the liquid crystal panel 110 receives light source of the backlight unit 120 from the backside thereof. The backlight unit 120 includes a plurality of fluorescent lamps 124 disposed in a row. A reflective sheet 122 is disposed under the fluorescent lamps 124. Each of both end portions of the fluorescent lamps are covered a side support 133. Furthermore, a plurality of optical sheets 126 is disposed over the fluorescent lamps 124.

An end portion of each of the fluorescent lamps 124 is inserted into a lamp socket 132. Here, the lamp socket 132 is soldered on a printed circuit board (PCB) 134. The lamp socket 132 can be attached to the PCB 134 by an auto attached method that is good in view of cost and stability in comparison with a hand-operated soldering method according to the related art. Specifically, the lamp socket 132 is connected to the PCB 134, the fluorescent lamp 124 is inserted into the lamp socket 132 and is connected to the lamp socket 132. The PCB 134 is disposed an end portion of the bottom frame 150 as a dummy space extending from the bottom frame 150. That is, the lamp socket 132 can support the fluorescent lamp 124.

Further, the PCB 134 includes a parallel driver that provides a high voltage of an alternating current waveform from the inverter unit 170 to the lamp socket 134. For example, the parallel driver is a capacitor having advantages that occupying area is relatively small and cost is relatively inexpensive.

Figure 5:
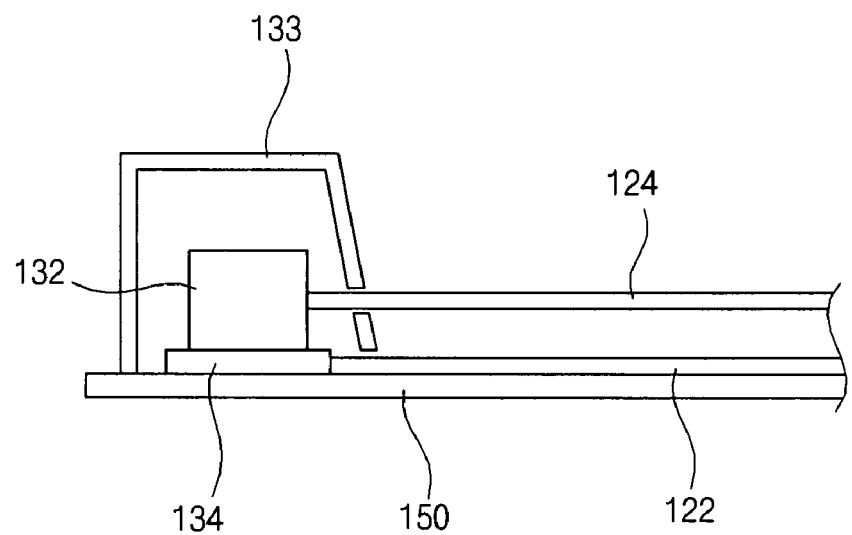
FIG. 5 is a schematic cross-sectional view of a portion of a backlight unit according to an embodiment of the present invention.

As shown in FIG. 5, the PCB 134 is mounted on an end portion of the bottom frame 150 along an outside of the reflective sheet 122, and the side support 133 is combined to the bottom frame 150 so that the side support 133 cover the lamp socket 132 and the PCB 134. Here, the fluorescent lamp 124 passes through the side support 133 via an opening of the side support 133.

Referring back to FIG. 4, a wire (not shown) extends from an end portion of the PCB 134 to a backside of the bottom frame 150 to connect a connector 138 of the inverter unit 170. The liquid crystal display panel 110 and the backlight unit 120 are combined using the main frame 130 that can prevent movement of the liquid crystal panel 110 and the backlight unit 120. The top frame 140 cover edges of the liquid crystal panel 110 and sides of the main frame 130, so the top frame 140 can support and protect of the edges of the liquid crystal panel 110 and sides of the main frame 130. The bottom frame 150 covers back edges of the main frame 140, so the bottom frame 150 is combined with the main frame 130 and the top frame 140 for modulation.

The inverter unit 170, which applies a power supply to the fluorescent lamp 124, is disposed under the bottom frame 150. The inverter unit 170 includes an inverter 136, a plug connector 138 as a connector of the fluorescent lamp 124, and an inverter PCB 135 on which the inverter 136 and the plug connector 138 are mounted.

A cover shield 180 protects the inverter unit 170. Accordingly, the backside of the bottom frame 150 and the cover shield 180 cover the inverter unit 170, thereby protecting the inverter unit 170 from external impact. Further, at least one of the bottom frame 150 and the cover shield 180 is made of a metallic material capable of protecting the inverter unit 170 from electromagnetic waves.

In particular, the inverter unit 170 according to the present invention can be connected to the PCB 134 through a small number of wires, the size of the inverter unit 170 can be reduced. Therefore, the size of the cover shield 180 can be reduced together with the inverter unit 170, thereby providing a compact and slim model.

Since the inverter 136 is mounted on the inverter PCB 135, the inverter 136 faces the cover shield 180. The inverter PCB 135 is combined with the cover shield 180 using a connector. The inverter unit 170 changes a power supply provided by an external power supply unit and applies the changed power supply to the fluorescent lamp 124.

While the inverter unit according to the related art includes a plurality of inverters corresponding to the plurality of fluorescent lamps, the inverter unit according to the present invention includes a small number of inverters 136. Since the plurality of fluorescent lamps is connected to the PCB 134 having the parallel drivers, the inverter unit 170 can be simply connected to the plurality of fluorescent lamps 124 through the PCB 134. In other words, the PCB 134 can simplify the connection structure of the plurality of fluorescent lamps 124 and the inverter unit 170 using the parallel driver. Therefore, the number of inverters in the inverter unit 170 can effectively be reduced, thereby reducing the size of the inverter unit 170.

According to en embodiment of the invention, the plurality of fluorescent lamps 124 does not directly receive power from the corresponding wires. Rather, the plurality of fluorescent lamps 124 receive a uniformly divided power supplied from the parallel drivers through the plurality PCB lines 334 of the PCB 134, respectively. Moreover, since the PCB 134 is mounted on an inner surface of the bottom frame 150, the available space in the LCDM can be used more efficiently. Here, the shape of the lamp socket 132 may be variable to support and fix the fluorescent lamp.

Figure 6:
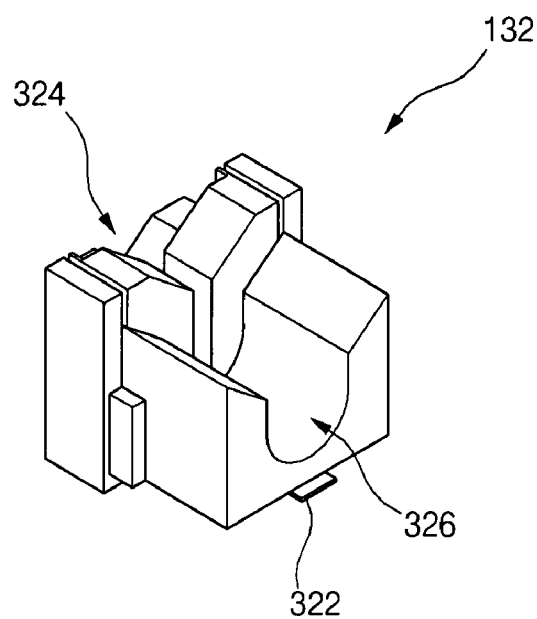
FIG. 6 is a schematic cross-sectional view of a lamp socket for a backlight unit according to an embodiment of the present invention.
Figure 7:
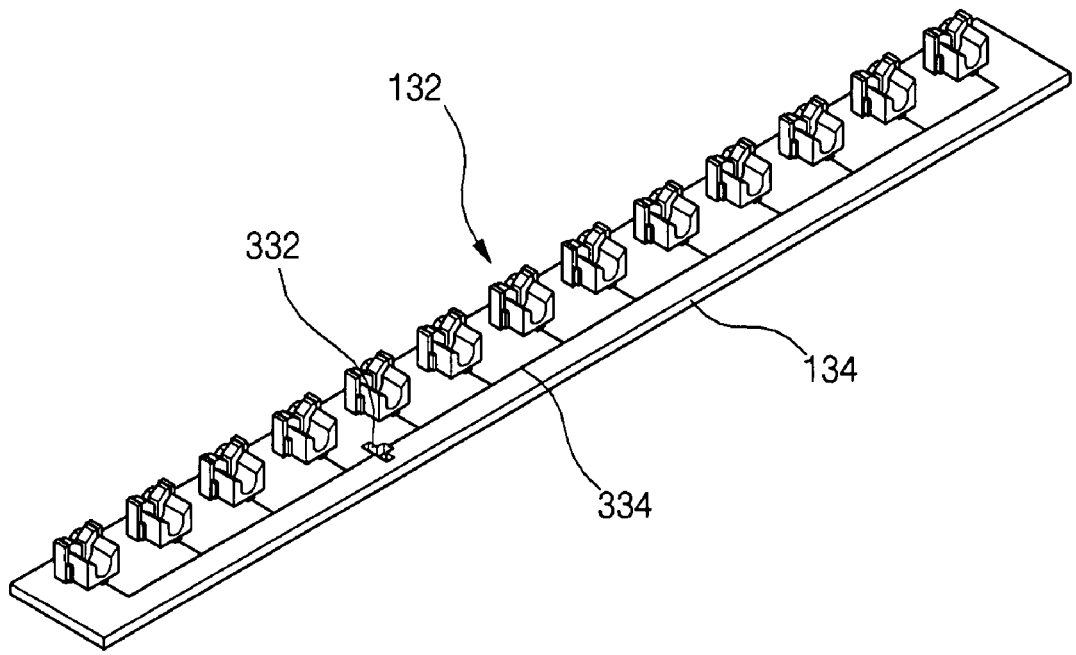
FIG. 7 is a perspective view of a PCB including a plurality of lamp sockets for a backlight unit according to an embodiment of the present invention.
Figure 8:
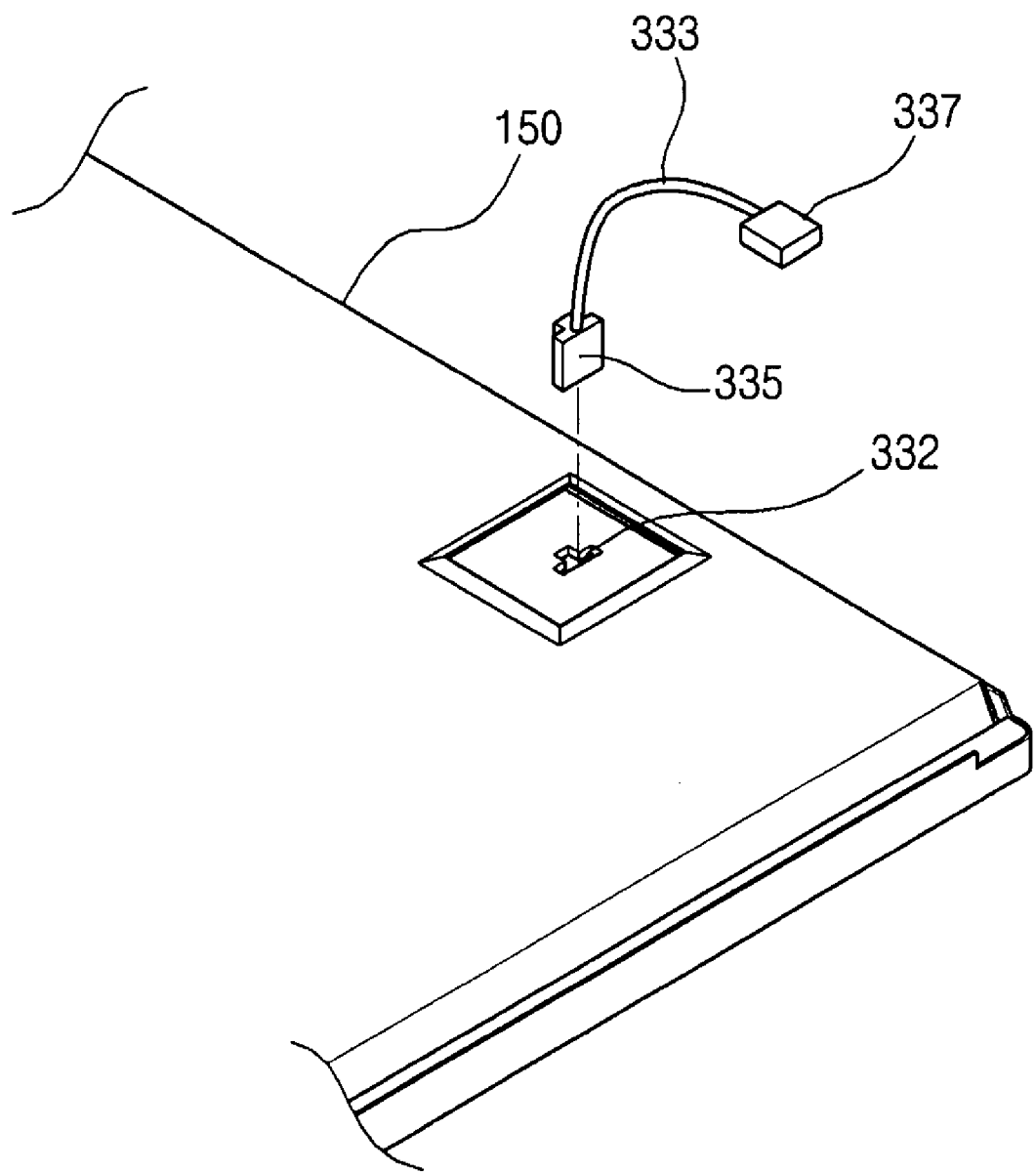
FIG. 8 is a partial view for a connection portion between a bottom frame and an inverter unit according to an embodiment of the present invention.

FIG. 6 is a schematic perspective view of a lamp socket for a backlight unit according to an embodiment of the present invention, FIG. 7 is a schematic perspective view of a PCB including a plurality of lamp sockets for a backlight unit according to an embodiment of the present invention, and FIG. 8 is a partial view for a connection portion between a bottom frame and an inverter unit according to an embodiment of the present invention. Referring to FIGS. 6, 7 and 8, a lamp socket 132 includes an electrode 322 connected to a PCB 134, a gripper 324 into which an electrode (not shown) of the fluorescent lamp 124 (of FIG. 5) is inserted, and a guide groove 326 supporting and fixing a glass tube of the fluorescent lamp 124 by covering the glass tube. A plurality of lamp sockets 132 are disposed in a row on the PCB 134 as shown in FIG. 7. Here, the lamp sockets 132 are soldered on the PCB 134. Further, a PCB line 334 extends from soldering portions of the lamp sockets 132 in a row. Although not shown, a plurality of parallel drivers are mounted on the PCB 134 and each of the plurality of parallel drivers is disposed between each of the lamp socket 132 and the PCB line 334. For example, the PCB line 334 may be formed by a photolithography to be provided as a thin film pattern.

Further, a first hole 332 is formed in the PCB 134 so that the first hole 332 is overlapped with the PCB line 334. The bottom frame 150 has a second hole 352 corresponding to the first hole 332. A wire 333 is formed to connect the inverter unit (not shown) via the first and second holes 332 and 352. Specifically, a first connector 335 is connected to one end portion of the wire 333 so that the first connector 335 is connected to the PCB line 334 via the first hole 332, and a second connector 337 is connected to the other end portion of the wire 333 so that the wire 333 is connected to the inverter unit via the second connector 337. That is, the PCB 134 and the inverter PCB (not shown) can be connected using the wire 333.

Furthermore, since a high current flows through the wire 333, the size of the second hole 352 of the bottom frame through which the wire 333 passes is determined considering a space distance and a side distance with respect to the wire 333. That is, according to the backlight unit of the present invention, simplification of the process and reduction of the cost can be expected because additional lamp holders are omitted.

Figure 9:
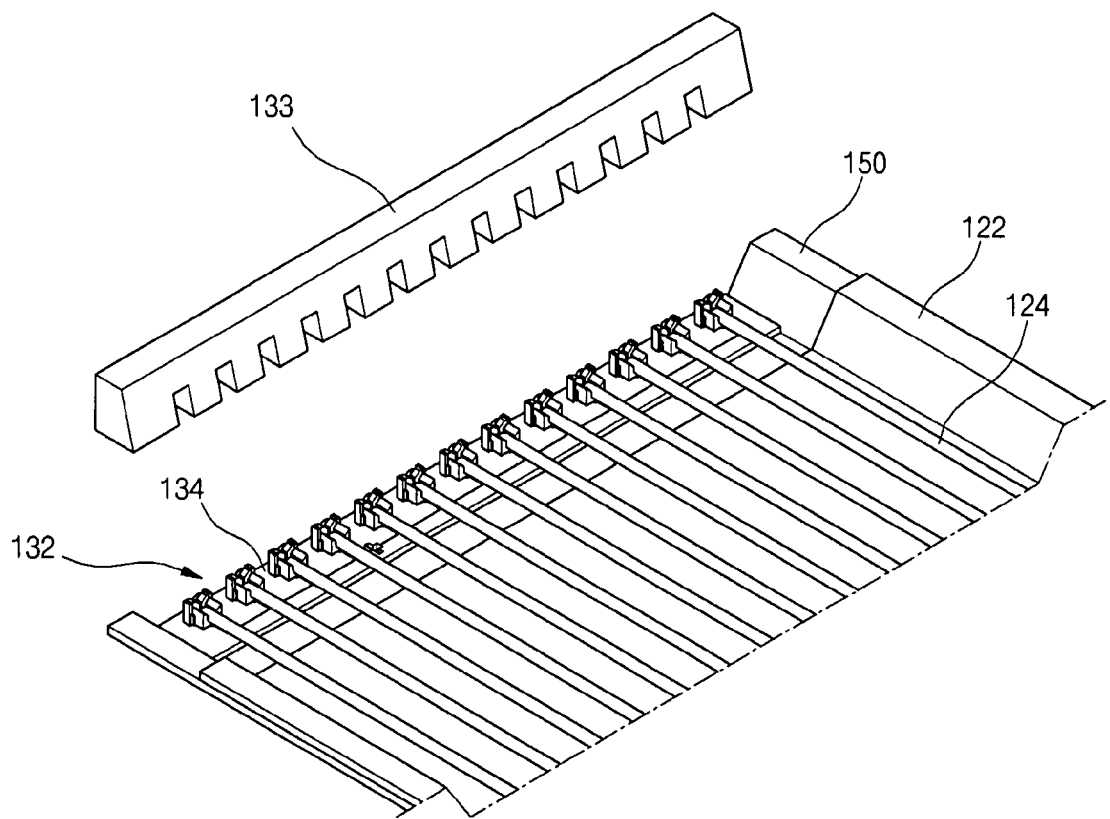
FIG. 9 is a schematic view of a backlight unit including a PCB according to an embodiment of the present invention.

FIG. 9 is a schematic view of a backlight unit including a PCB according to an embodiment of the present invention. Referring to FIG. 9, a plurality of fluorescent lamps 124 are disposed in a row on a reflective sheet 122 disposed on a bottom frame 150. A PCB 134 including a plurality of lamp sockets 132 is disposed at end portion of the bottom frame 150 outside of the reflective sheet 122. Here, each of the plurality of fluorescent lamps 124 is inserted into each of the plurality of lamp sockets 132 to be stably mounted on the bottom frame 150. For example, the lamp sockets 132 include a plastic material for insulating, buffering and supporting the fluorescent lamps 124. The PCB 134 includes the plurality of lamp sockets 132 in a row and is disposed at the end portion of the bottom frame 150 so that the PCB 134 is connected to the inverter unit 170 with a minimum distance. The PCB 134 is attached to the bottom frame 150 using a connector. A side support 133 is attached to the bottom frame 150 by covering the PCB 134 and includes a plurality of openings (not shown) corresponding to the plurality of fluorescent lamps 124 so that each of the fluorescent lamps 124 passes through the each of the openings.

Figure 10:
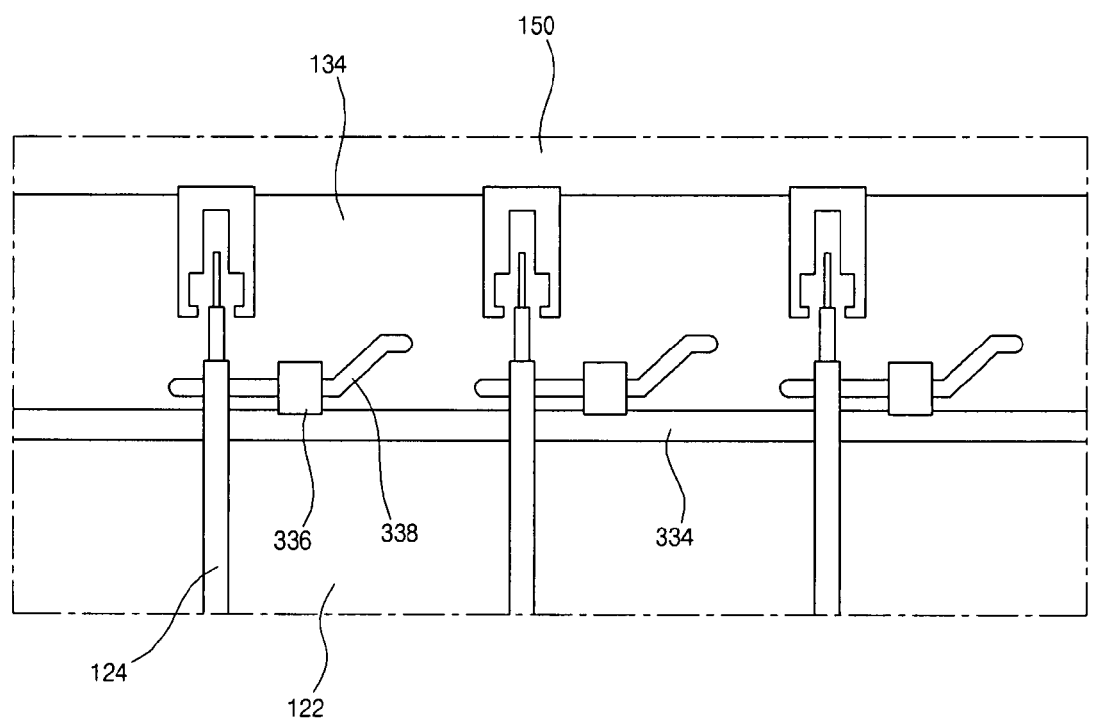
FIG. 10 is a view of a PCB including a capacitor according to an embodiment of the present invention.

FIG. 10 is a view of a balanced PCB including a capacitor according to an embodiment of the present invention. Referring to FIG. 10, a PCB 134 includes a plurality of capacitors 336 and a plurality of lamp sockets 134. Here, one lamp socket 132 is coupled to one capacitor 336. Specifically, a PCB line 334 is formed along a length direction of the PCB 134, and each of the capacitors 336 is disposed between each of the lamp sockets 132 and the PCB line 334. Here, a gap space 338 is defined between the capacitor 336 and the lamp socket 132, and the gap space minimizes an electric effect between the lamp socket 132 and the PCB line 334.

Although not shown, the fluorescent lamp according to an embodiment of the present invention is driven in a high-high mode. The PCB 134 including the capacitor 336 shown in FIG. 10 is disposed on the other end portion of the bottom frame 150. However, the inverter unit 170 can be located at various alternative positions. For example, the inverter unit may be disposed at one of the end portion of the bottom frame 150 by extending a second wire from a second PCB 134 through an inner edge of the bottom frame 150 and by passing through a third hole of the bottom frame 150 adjacent to the second hole of the bottom frame 150 so that the second wire is connected to the same inverter unit 170 with a first wire of a first PCB 134. Here, when the second wire passes the inner edge of the bottom frame, the reflective sheet covers the second wire to prevent an electric defect due to the second wire.

Alternatively, the fluorescent lamp can be driven in a high-low mode. Then, the capacitor may be omitted in the low type fluorescent lamp.

Figure 11:
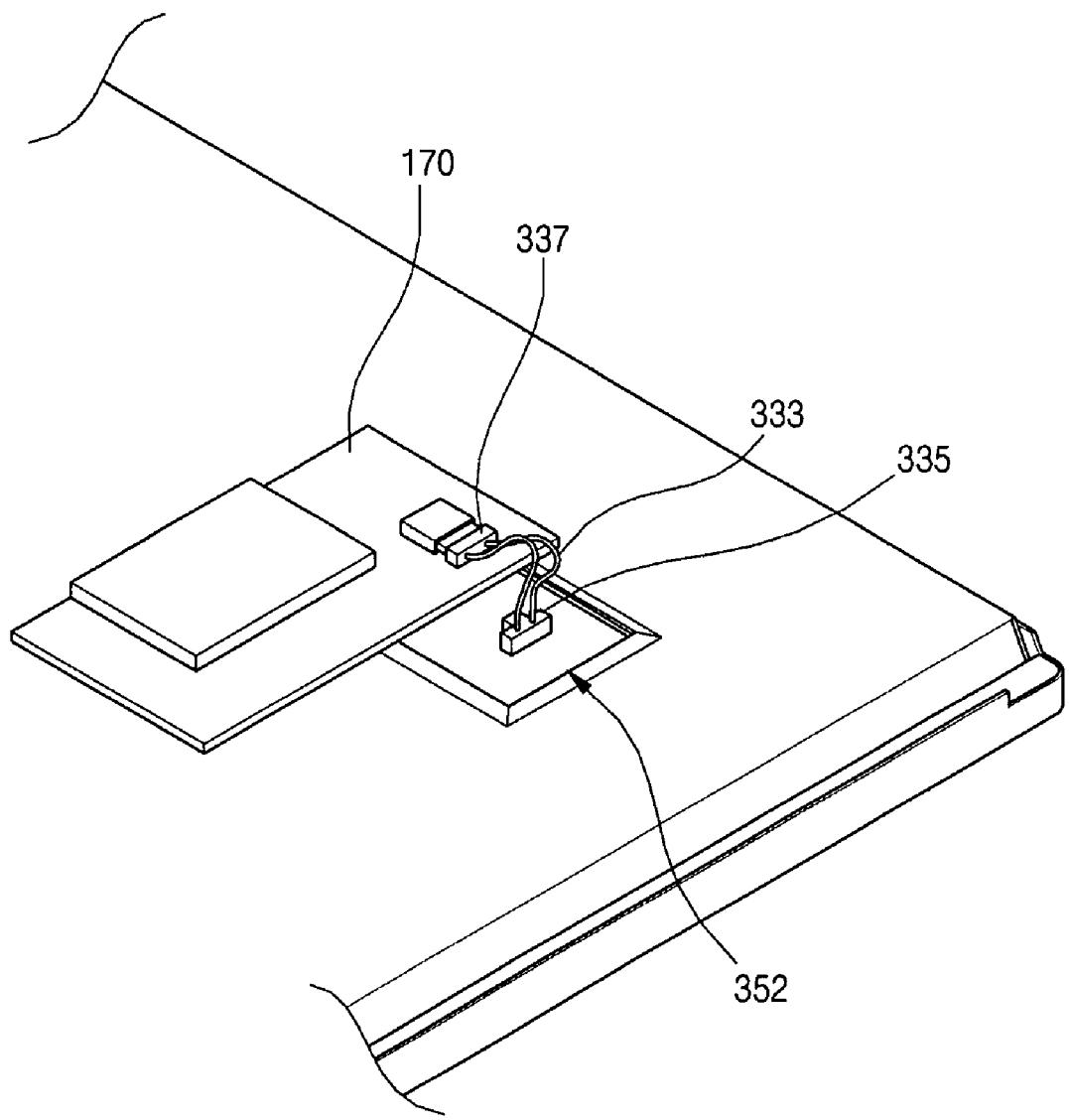
FIG. 11 is a view of a backlight unit attached to an inverter unit according to an embodiment of the present invention.

FIG. 11 is a view of a backlight unit attached to an inverter unit according to an embodiment of the present invention. Referring to FIG. 11, a bottom frame 150 has a second hole 352 having a square shape, a first connector 335 is connected to a PCB 334 (of FIG. 7), a wire 333 extends form the first connector 335, and a second connector 337 is connected to the other end portion of the wire 333 to be connected to the inverter unit 170.

In accordance with an embodiment of the present invention, the PCB in which a plurality of lamp sockets are disposed in a row can connect the plurality of fluorescent lamps using the lamp sockets at a time.

Further, since the fluorescent lamps are connected to the lamp sockets in a row, the number of inverters and the wires can be reduced compared to the related art. Accordingly, respective hand-operated soldering process between the each of the fluorescent lamps and each of the wires can be omitted, thereby reducing the process time, the process cost and possibility of the defects.

In accordance with an embodiment of the invention, a wire connects the PCB and the inverter PCB through the first hole of the PCB and the second hole of the bottom frame, thereby preventing a current leakage. Furthermore, since the lamp socket supports the fluorescent lamp, additional lamp holder can be omitted. Therefore, the process time and cost can be effectively reduced.

In addition, since the PCB is mounted on a dummy space between the inner surface of the bottom frame and the side support, the dummy space can be used efficiently. Furthermore, the size of the cover shield together with the size of the inverter unit is reduced, thereby providing much compacter and slimmer model than the related art.

It will be apparent to those skilled in the art that various modifications and variations can be made in the exemplary embodiments of the LCDM of the present invention without departing from the spirit or scope of the invention. Thus, it is intended that the present invention cover the modifications and variations of this invention provided they come within the scope of the appended claims and their equivalents.

What is claimed is:

1. A backlight unit for a display device, comprising:
   a frame;
   a circuit board extending from an end of and on a first surface of the frame;
   lamps over the frame; and
   an inverter on a second surface of the frame connected to an end of each of the lamps via a first hole through the frame and a second hole through the circuit board,
   wherein the second hole overlapping the first hole, and
   wherein the circuit board electrically connects the inverter and the lamps.

2. The backlight unit of claim 1, further comprising a line on the circuit board for electrically connecting the lamps to the inverter.

3. The backlight unit of claim 1, further comprising a plurality of sockets attached to the circuit board for connecting the lamps.

4. The backlight unit of claim 3, further comprising balancing elements on the circuit board for balancing a current through each of the lamps, wherein each of the balancing elements is adjacent to a corresponding one of the plurality of sockets.

5. The backlight unit of claim 1, further comprising balancing elements on the circuit board for balancing a current through each of the lamps, wherein each of the balancing elements includes a capacitor.

6. The backlight unit of claim 1, further comprising a support attached to the frame, the support covering the circuit board and the end of each of the lamps.

7. The backlight unit of claim 1, further comprising a reflector on the frame under the plurality of the lamps.

8. The backlight unit of claim 1, further comprising another circuit board at another end of and on the first surface of the frame.

9. The backlight unit of claim 8, wherein the inverter is connected to another end of each of the lamps through the other circuit board.

10. The backlight unit of claim 1, further comprising a cover for shielding the inverter.

11. The backlight unit of claim 10, wherein the size of the cover corresponds to the size of the inverter.

12. The backlight unit of claim 1, further comprising a connector for connecting the inverter to the circuit board.

13. A liquid crystal display module, comprising:
   a liquid crystal panel; and
   a backlight unit for projecting light on the liquid crystal panel, the backlight unit comprising:
      a first frame;
      a circuit board extending from an end of and on a first surface of the first frame;
      lamps over the first frame; and
      an inverter on a second surface of the first frame connected to an end of each of the lamps via a first hole through the first frame and a second hole through the circuit board,
      wherein the second hole overlapping the first hole, and wherein the circuit board electrically connects the inverter and the lamps.

14. The liquid crystal display module of claim 13, further comprising an optical sheet over the lamps.

15. The liquid crystal panel of claim 14, further comprising a second frame surrounding the optical sheet and attached to the first frame.

16. The liquid crystal display panel of claim 15, further comprising a third frame surrounding an edge of the liquid crystal panel and attached to the first and second frames.

17. The liquid crystal display panel of claim 13, wherein each of the lamps includes a cold cathode fluorescent lamp.

18. The liquid crystal display panel of claim 17, wherein the backlight unit further comprises balancing elements on the circuit board for balancing a current through each of the lamps.

19. The backlight unit of claim 1, wherein each of the lamps includes a cold cathode fluorescent lamp.

20. The backlight unit of claim 19, further comprising balancing elements on the circuit board for balancing a current through each of the lamps.

* * * * *